United States Patent Office 3,701,774
Patented Oct. 31, 1972

3,701,774
5,5αβ,13,13αβ-TETRAHYDRO-5β,13β - DIHYDROXY-8H,16H-7α,15α - EPIDITHIO-7H-15H-BISOXEPINO-[3'4':4,5]PYRROLO[1,2-a:1',2'-d]-PYRAZINE - 7,15-DIONE, DIACETATE AND PRODUCTION THEREOF USING *ASPERGILLUS TERREUS*
Philip Andrew Miller, West Nyack, and Patrick Willoughby Trown, Suffern, N.Y., assignors to American Cyanamid Company, Stamford, Conn.
No Drawing. Filed July 2, 1968, Ser. No. 741,849
Int. Cl. C07d 93/20; A61l 13/00
U.S. Cl. 260—243 R          2 Claims

ABSTRACT OF THE DISCLOSURE

This disclosure describes 5,5αβ,13,13αβ-tetrahydro-5β, 13β - dihydroxy - 8H,16H-7α,15α-epidithio-7H,15H-bisoxepino[3',4':4,5]pyrrolo[1,2-a:1',2'-d]pyrazine - 7,15 - dione, diacetate, a new compound useful as an antiviral agent.

BRIEF SUMMARY OF THE INVENTION

This invention relates to a new antiviral compound, 5,5αβ,13,13αβ - tetrahydro - 5β,13β-dihydroxy-8H,16H-7α,15α - epidithio - 7H,15H-bisoxepino[3',4':4,5]pyrrolo [1,2-a:1',2'-d]pyrazine-7,15-dione, diacetate, which may be represented by the following structural formula:

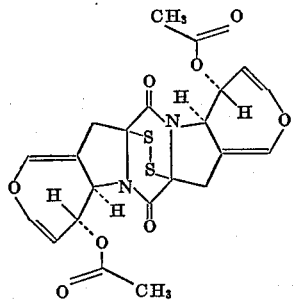

The invention includes within its scope the production of the new antiviral compound by fermentation of strains of *Aspergillus terreus* and to methods for its recovery and concentration from crude solutions, and to processes for its purification. The invention also includes within its scope the antiviral compound in dilute forms, as crude concentrates, and in pure crystalline form. The novel antiviral compound of the present invention is active against a broad range of RNA viruses including strains of rhino-, Coxsackie and parainfluenza viruses.

DETAILED DESCRIPTION OF THE INVENTION

The new antiviral compound, 5,5αβ,13,13αβ-tetrahydro-5β,13β - dihydroxy-8H,16H-7α,15α-epidithio-7H,15H-bisoxepino[3',4':4,5]pyrrolo[1,2-a:1',2' - d]pyrazine - 7,15-dione, diacetate, which we have designated LL–S88α for convenience, is formed during the cultivation under controlled conditions of strains of *Aspergillus terreus*. *Aspergillus terreus* has been described, based on diagnostic characteristics observed, in the book The genus Aspergillus by K. B. Raper and D. I. Fennell, Williams & Wilkins Company, Baltimore, Md., 1965, pages 568 to 572. The present invention is not particularly concerned with any specific microorganism except to the extent that it is concerned with those microorganisms that produce the compound LL–S88α by fermentative biosynthesis. Insofar as is presently known, all such microorganisms are of the species *Aspergillus terreus*. Typical strains of *Aspergillus terreus* which will produce the compound LL–S88α by fermentative biosynthesis are the following: NRRL 255; NRRL 265; NRRL 571; NRRL 1913; NRRL 1921; NRRL 3319; ATCC 12238. Viable subcultures of these strains are freely available to the public from the Northern Regional Research Laboratory, Peoria, Ill. or from the American Type Culture Collection, Washington, D.C.

It is to be understood that for the production of the new antiviral compound, the present invention is not limited to these particular organisms only, nor to organisms fully answering the growth and microscopic characteristics given in the cited book by Raper and Fennell. In fact, it is desired and intended to include the use of mutants produced from these organisms by various means, such as X-radiation, ultraviolet radiation, nitrogen mustard, phage exposure, and the like.

THE FERMENTATION PROCESS

Cultivation of the organism *Aspergillus terreus* for the production of the novel antiviral is carried out in liquid culture media. Aeration in tanks and bottles is provided by forcing sterile air through or onto the surface of the fermenting medium. Further agitation in tanks is provided by a mechanical impeller. An antifoaming agent, such as 1% octadecanol in lard oil, may be added as needed.

INOCULUM PREPARATION

Shaker flask inoculum of *Aspergillus terreus* is prepared in 500 milliliter flasks by inoculating 100 milliliters of sterile liquid medium with scrapings or washings of spores from an agar slant of the culture. The following medium is preferably used.

|                              | Grams |
|------------------------------|-------|
| Cerelose                     | 15    |
| Sucrose                      | 15    |
| Sodium nitrate               | 2     |
| Potassium acid phosphate     | 1     |
| Magnesium sulfate.7H$_2$O    | 0.5   |
| Potassium chloride           | 0.5   |
| Ferrous sulfate.7H$_2$O      | 0.01  |
| Beef extract                 | 0.5   |
| Yeast extract                | 0.125 |
| Water to 1,000 milliliters.  |       |

The flasks are incubated at a temperature from 25–29° C., preferably 28° C., and agitated vigorously on a rotary shaker for 30 to 48 hours. These 100 milliliter inocula are used to inoculate 1 liter and 12 liter batches of the same medium in 2 liter and 20 liter glass fermentors. The inoculum mash is aerated with sterile air while growth is continued for 30 to 48 hours. These batches in inocula are used to inoculate tank fermentors.

TANK FERMENTATION

For the production of the antiviral in tank fermentors, the fermentation medium used preferably is the same as the inoculum medium previously described. Each tank is inoculated with 3 to 10% of inoculum obtained as described in Example 1. Aeration is supplied at the rate of 0.1–0.5 liter of sterile air per liter of broth per minute and the fermenting mixture is agitated by an impeller driven at 150–300 r.p.m. The temperature is maintained at 25–29° C., usually at 28° C. The fermentation is ordinarily continued for 80–120 hours, at which time the mash is harvested.

ISOLATION PROCEDURE

After the fermentation is completed, the fermented mash containing the antiviral of this invention is filtered at the existing pH to remove the mycelium. Diatomaceous earth or any other conventional inert filtration aid may be used to assist filtration. Ordinarily the mycelial cake is washed with water and the wash is pooled with the filtrate. The pH of the combined filtrate and washings is adjusted to 5.0 to 5.4 with acid, preferably hydrochloric acid. The adjusted solution is then extracted with two portions of chloroform, each portion being about 10% of the volume of combined filtrate and washings. The combined chloroform extracts are concentrated at temperatures from 30 to 40° C. to a volume slightly more than 1% of the original combined filtrate and washings. The chloroform concentrate thus obtained is further concentrated in a rotary evaporator to yield a viscous, black syrup which is subsequently dried under reduced pressure. The resultant dry material is extracted with a small portion of chloroform and the residual insoluble material is discarded. The chloroform extract is evaporated to dryness under reduced pressure and the dry residue is dissolved in boiling ethanol. A crystalline material is obtained on cooling the ethanolic solution. This material is separated by filtration and the solid is recrystallized from benzene, or from a mixture of acetone and cyclohexane yielding antiviral LL–S88α as light tan crystals.

Slight variations in the described procedure are permitted if desired. For example, instead of concentrating the chloroform extracts to dryness, absolute alcohol may be added to the chloroform concentrate before dryness is reached. Further concentration of this mixture initiates precipitation of crude LL–S88α. Cooling of the suspension below room temperature or preferably 3–5° C. precipitates additional LL–S88α.

Isolation of LL–S88α may be monitored throughout the process using thin layer chromatography techniques carried out on Eastman Chromagram K301R or on plates precoated with Gel $F_{254}$ manufactured by E. Merck A.G., Darmstadt, Germany and distributed by Brinkmann, Long Island, N.Y. Chloroform or a mixture of chloroform and ethyl acetate (1:1 by volume) is used to develop the plates. Zones are detected by ultraviolet light, iodine vapor staining or sulfuric acid charring. A sodium azide-iodine spraying reagent prepared as described in Feigl, F., Spot Tests in Organic Analysis, Elsevier Publishing Co., N.Y. (1956), p. 88, may also be used and reveals gliotoxin a co-produced antibiotic, and antiviral LL–S88α as white zones on a dark background. When thin layer chromatography is carried out as described above, the $R_f$ of gliotoxin is 0.30 while LL–S88α has $R_f$ 0.45 using a mixture of chloroform and ethyl acetate (1:1 by volume).

CHARACTERISTICS OF LL–S88α

The novel antiviral compound LL–S88α has a melting point of 230° C. The optical rotation of LL–S88α is $[\alpha]_D^{25} = -528 \pm 3°$ (c.=1.0412% $CHCl_3$). The ultraviolet absorption spectra shows end absorption. An infrared absorption spectrum of the LL–S88α components in a KBr pellet is prepared in a standard manner. It exhibits characteristic absorption in the infrared region of the spectrum from 2 to 15 microns at the following wavelengths expressed in microns: 2.98, 3.42, 5.73, 5.85, 6.02, 6.94, 7.32, 7.42, 7.68, 7.81, 8.14, 8.38, 8.76, 9.25, 9.62, 9.79, 10.15, 10.35, 10.85, 11.0, 11.3, and 11.5.

The usefulness of the new antiviral is demonstrated by its ability to control lethal viral infections in mice. LL–S88α shows significant antiviral activity in mice against Coxsackie A21 (Coe) virus. In this test procedure the test compound was administered in 4 subcutaneous doses to groups of Carworth Farms male, white mice, weight about 12 grams, infected by an intraperitoneal injection of a Coxsackie A21 (Coe) virus preparation. The 4 doses of test compound, suspended in water, were administered at 18 hours before injection of the virus, immediately after, and at 2 and 4 hours after injection of the virus. Groups of infected, untreated mice are used as controls to show the lethality of the infection. Table I, below, shows pooled results, expressed as percent survivors on the 14th day after infection, of several tests run according to the above-described test procedure.

TABLE I

Effect of LL–S88α on the Survival of Mice Infected with Coxsackie A21 (Coe) Virus

| Treatment | Each dose, mg./kg. | Survival ratio | Percent survivors |
|---|---|---|---|
| LL–S88α | 30 | 50/60 | 83 |
|  | 15 | 39/55 | 71 |
|  | 8 | 11/15 | 73 |
| Infected, untreated controls |  | 24/120 | 20 |

LL–S88α was found to be active against various rhino viruses when tested in cell cultures. The criteria for determining activity was the inhibition of cytopathic effects produced by the virus. The testing procedure used in connection with rhinoviruses, the causative agents of the common cold in man, was carried out essentially as follows. Monolayers of human embryonic lung cells, Wistar Institute (WI–38) in tubes containing 1.8 ml. of Earle's lactalbumin hydrolysate medium supplemented with 2% calf serum were used as tissue culture systems. Viruses used in the testing program included Rhinovirus strain 2060, ATCC VR242; Rhinovirus strain 1734, ATCC VR285; Rhinovirus strain HGP–5; Rhinovirus strain 11,757, ATCC VR283 and Rhinovirus strain 1059. Test compounds were dissolved or suspended in Earle's lactalbumin hydrolysate medium. Each compound was ordinarily tested in duplicate or triplicate. Results are given in Table II below.

TABLE II

| Virus: | Minimum inhibitory concentration µg./ml., LL–S88α |
|---|---|
| Rhinovirus strain 2060 | 0.6 |
| Rhinovirus strain 1734 | 5 |
| Rhinovirus strain HGP–5 | 1 |
| Rhinovirus strain 11,757 | 5 |
| Rhinovirus strain 1059 | 1 |

Compound LL–S88α was also tested for activity against Poliovirus, type I and Coxsackie A21 (Coe) virus in cell cultures. In this test LL–S88α was added in various concentrations to 3-day cultures of HeLa $S_3$ cells in tubes 10 minutes before infection with Poliovirus, type I (0.001 pfu./cell) or Coxsackie A21 (Coe) virus (0.02 pfu./cell). Minimum concentrations of test compound for inhibition of cytopathic effects were determined as shown in Table III, below.

TABLE III

| Virus: | Minimum inhibitory concentration µg./ml., LL–S88α |
|---|---|
| Poliovirus, type I | 1 |
| Coxsackie A21 (Coe) | 4 |

Additionally, LL–S88α was also tested for activity against Parainfluenza, type 3 virus, in cell cultures. Small flasks (25 cm.²) containing a confluent monolayer of HeLa $S_3$ cells were infected with 50–100 pfu./cell of virus. LL–S88α in various concentrations and Earle's MEM medium were added one hour after infection and the flasks were incubated for 24 hours. The medium was poured off and the cell sheet was stained with a 0.1% alcoholic solution of crystal violet. Minimum concentrations of LL–S88α for inhibition of plaque formation were determined as shown in Table IV below.

TABLE IV

| Virus: | Minimum inhibitory concentration µg./ml., LL–S88α |
|---|---|
| Parainfluenza, type 3 | 2.5 |

Compound LL–S88α was also tested for activity against Influenza B (Maryland) virus. LL–S88α was administered in a single subcutaneous dose to a group of Carworth Farms, male, white mice, weight about 20 grams, infected intranasaly with 0.05 milliliter of $1\times10^{-3.5}$ dilution (brain, heart infusion broth) with stock virus preparation. The test compound was administered immediately after infection. Infected, untreated mice are used as controls to show the lethality of the infection. Table V, below, shows results expressed as percent survivors on the 14th day after infection obtained on a test run according to the above described procedure.

TABLE V

Effect of LL–S88α on the Survival of Mice Infected with Influenza B (Maryland) Virus

| Treatment | Each dose, mg./kg. | Survival ratio | Percent survivors |
|---|---|---|---|
| LL–S88α | 90 | 9/20 | 45 |
| Infected, untreated controls | | 0/15 | 0 |

The invention will be described in greater detail in conjunction with the following specific examples.

EXAMPLE 1

Inoculum preparation

A typical medium used to grow the primary inoculum was prepared according to the following formula:

| | Grams |
|---|---|
| Cerelose | 15 |
| Sucrose | 15 |
| Sodium nitrate | 2 |
| Potassium acid phosphate | 1 |
| Magnesium sulfate.7H$_2$O | 0.5 |
| Potassium chloride | 0.5 |
| Ferrous sulfate.7H$_2$O | 0.01 |
| Beef extract | 0.5 |
| Yeast extract | 0.125 |

Water to 1,000 milliliters.

The washed or scraped spores from an agar slant of *Aspergillus terreus* were used to inoculate two flasks containing 100 milliliters each of the above medium in 500 milliliter flasks. The flasks were placed on a rotary shaker and agitated vigorously for 48 hours, at 28° C. The resulting flask inoculum was transferred to a 5 gallon glass fermentor containing 12 liters of the same sterile medium. The glass fermentor was aerated with sterile air while growth was carried out for about 48 hours, after which time the contents were used to seed a 300 liter tank fermentor.

EXAMPLE 2

Fermentation

A fermentation medium was prepared according to the inoculum medium formula described in Example 1 and sterilized at 120° C. with steam at 15 pounds pressure for 45–60 minutes. The pH of the medium after sterilization was 6.0. Three hundred liters of the sterile medium in a 400 liter tank fermentor was inoculated with 12 liters of inoculum, such as described in Example 1, and the fermentation was carried out at 28° C. Aeration was supplied at the rate of 0.1–0.2 liter of sterile air per liter of mash per minute. The mash was agitated by an impeller driven at 200 revolutions per minute. At the end of approximately 90 hours of fermentation time the mash was harvested.

EXAMPLE 3

Isolation 300 liters of fermented mash were filtered with about 2% (w./v.) of Hyflo®, a diatomaceous earth filter aid, and the filter pad was washed with about 30 liters of water. The filtrate was pooled with the wash (total volume 300 liter) and contains substantially all of the antiviral produced in the fermentation mash. The pH of the combined filtrate and washings was adjusted to 5.0 with hydrochloric acid. The pH-adjusted solution was extracted with two 30 liter portions of chloroform. The combined chloroform extracts were concentrated at about 34° C. to a volume of about 4 liters. The 4 liters of concentrate was further concentrated using a rotary evaporator to a thick, black colored syrup which was then dried, under reduced pressure. The resulting solids were extracted with 150 ml. of chloroform and the residual insoluble material was discarded. The chloroform extract was evaporated to dryness under reduced pressure and the residue was dissolved in 100 ml. of boiling ethanol. A crystalline material (1.2 g.) was formed on cooling of the ethanolic solution and separated by filtration. This material was recrystallized from benzene yielding 166 mg. of light tan crystals, substantially pure LL–S88α.

EXAMPLE 4

Alternate isolation 2500 liters of fermented mash (pH 5.3), prepared essentially as described in the general procedure and Examples 1 and 2, are filtered with about 2% (v./v.) of Hyflo®, and the filter pad is washed with about 200 liters of water. The filtrate, pooled with the wash (total volume 2500 liters, pH 5.4), is extracted with two 250 liter portions of chloroform. The combined chloroform extracts are concentrated under reduced pressure to about 4.2 liters. The precipitate which forms in the chloroform extract is removed by filtration. The extract is further concentrated under reduced pressure to a volume of about 1.8 liters and the insoluble material is again removed by filtration. The extract is further concentrated to a viscous dark syrup, to which 400 ml. of chloroform is added. Insoluble material is removed by filtration. About 1 liter of absolute ethanol is stirred into the clear amber chloroform solution and the mixture is concentrated under reduced pressure to about 550 ml. Crystalline solid begins to precipitate and the suspension is cooled at 3–5° C. for about 1.5 hours. The cooled suspension is filtered separating the crystals of crude LL–S88α. The crystals are washed with cold ethanol, acetone and diethyl ether yielding 10.01 g. of product.

Recrystallization may be effected by dissolving the crude LL–S88α in acetone, decolorizing the colored solution with activated carbon (Darco G–60), heating to boiling temperature and filtering the hot solution through a sintered-glass funnel precoated with Celite® 545. The filtrate is cooled to room temperature. Cyclohexane is added and this solution is concentrated under reduced pressure to a point where solids begin to form. The concentrate is cooled in an ice-bath and the crystals are removed by filtration and washed first with a 1–1 mixture of acetone and cyclohexane and followed with diethyl ether. Purified LL–S88α is obtained as pale yellow crystals.

What is claimed is:
1. A process which comprises cultivating a microorganism selected from the group consisting of a strain of *Aspergillus terreus* and mutants thereof in an aqueous nutrient medium containing assimilable sources of carbohydrate, nitrogen, sulfur and inorganic salts under submerged aerobic conditions until substantial antiviral activity is imparted to said medium by the production of the compound 5,5α$\beta$,13,13α$\beta$-tetrahydro - 5$\beta$ - 13$\beta$-dihydroxy - 8H,16H - 7α,15α - epidithio - 7H,15H - bisoxepino-

[3',4':4,5]-pyrrolo[1,2 - a:1',2' - d]pyrazine - 7,15-dione, diacetate.

2. A process which comprises cultivating a microorganism selected from the group consisting of a strain of *Aspergillus terreus* and mutants thereof in an aqueous nutrient medium containing assimilable sources of carbohydrate, nitrogen, sulfur and inorganic salts under submerged aerobic conditions for a period of time of from about 80 to about 120 hours and at a temperature of from about 25° C. to about 29° C. until substantial antiviral activity is imparted to said medium by the production of 5,5α$\beta$,13,13α$\beta$ - tetrahydro - 5$\beta$,13$\beta$ - dihydroxy - 8H,16H-7α,15α - epidithio - 7H,15H - bisoxepino[3',4':4,5]pyrrolo[1,2 - a:1',2' - d]pyrazine - 7,15 - dione, diacetate, and then recovering the antiviral activity therefrom.

References Cited

UNITED STATES PATENTS

| | | | |
|---|---|---|---|
| 2,556,376 | 6/1951 | Regna et al. | 260—236.5 X |
| 3,408,350 | 10/1968 | Houlihan | 260—243 |
| 3,455,933 | 7/1969 | Georgiadis et al. | 260—243 |

OTHER REFERENCES

Nagarajan et al., J. Amer. Chem. Soc., vol. 90, pp. 2980–2, May 22, 1968.

JOHN M. FORD, Primary Examiner

U.S. Cl. X.R.

195—105; 424—246